United States Patent [19]
Pollard et al.

[11] Patent Number: 5,310,233
[45] Date of Patent: May 10, 1994

[54] ROBOTIC END GRIPPER WITH A BAND MEMBER TO ENGAGE OBJECT

[75] Inventors: Roy E. Pollard, Maryville; Samuel C. Robinson, Knoxville; William F. Thompson, Oak Ridge; Scott A. Couture, Knoxville; Bill J. Sutton, Powell, all of Tenn.

[73] Assignee: Martin Marietta Energy Systems, Inc., Oak Ridge, Tenn.

[21] Appl. No.: 872,152

[22] Filed: Apr. 22, 1992

[51] Int. Cl.$^5$ .............................................. B25J 15/00
[52] U.S. Cl. ................................. 294/86.4; 294/103.1; 294/119.2; 294/131; 901/31; 901/39
[58] Field of Search .............. 294/19.1, 31.2, 86.4, 294/86.41, 88, 100, 103.1, 111, 119.2, 131, 902; 81/64, 65; 269/130, 131; 414/23, 448, 449, 607, 618, 619, 729, 735, 741, 745.1, 745.4; 901/30, 31, 36-39

[56] References Cited

U.S. PATENT DOCUMENTS

| 433,356 | 7/1990 | Long . | |
|---|---|---|---|
| 1,569,496 | 1/1926 | Johnson . | |
| 1,661,064 | 2/1928 | Blaser . | |
| 1,828,106 | 10/1931 | Ertola | 294/31.2 X |
| 2,718,166 | 9/1955 | Hollenbeck | 81/65 |
| 3,540,769 | 11/1970 | Rosser . | |
| 3,970,342 | 7/1976 | Cotton | 294/86.4 |
| 4,280,785 | 7/1981 | Albrecht | 414/735 |
| 4,362,435 | 12/1982 | Henry | 294/86.41 X |
| 4,615,656 | 10/1986 | Geraghty | 294/86.41 X |
| 4,652,204 | 3/1987 | Arnett . | |
| 4,896,914 | 1/1990 | Stevens . | |
| 4,950,015 | 8/1990 | Nejib et al. . | |
| 5,011,207 | 4/1991 | Stevens . | |

FOREIGN PATENT DOCUMENTS

| 2578183 | 9/1986 | France | 901/31 |
|---|---|---|---|
| 571369 | 9/1977 | U.S.S.R. . | |
| 611775 | 5/1978 | U.S.S.R. . | |
| 689824 | 5/1979 | U.S.S.R. . | |
| 673420 | 7/1979 | U.S.S.R. | 294/86.4 |
| 751794 | 7/1980 | U.S.S.R. | 294/86.4 |
| 772844 | 10/1980 | U.S.S.R. . | |
| 1184664 | 10/1985 | U.S.S.R. | 901/31 |
| 1191283 | 11/1985 | U.S.S.R. . | |
| 1298074 | 3/1987 | U.S.S.R. | 901/36 |
| 1451002 | 1/1989 | U.S.S.R. . | |
| 1553381 | 3/1990 | U.S.S.R. | 901/39 |

*Primary Examiner*—Johnny D. Cherry
*Attorney, Agent, or Firm*—Martin J. Skinner; Joseph A. Marasco; Harold W. Adams

[57] ABSTRACT

An end effector for use with robotic arms and like devices that utilizes a flexible band to draw an object against an anvil having a concave surface. One typical convex surface is created by a V-block, with an apex of the V being centrally located. If an object to be grasped is fragile, the contour of the concave surface closely matches the surface of the object. Typically the movement of the band is effected by a linear actuator, with the anvil remaining fixed relative to a support base. Several embodiments are described that utilize variations in drawing the band toward the anvil, with one of these embodiments described in detail in the form of a fabricated unit. One embodiment includes a cover element that can be moved over an object after the grasping thereof, with this cover potentially serving various functions. Movement of the cover can be effected with a second linear actuator.

19 Claims, 4 Drawing Sheets

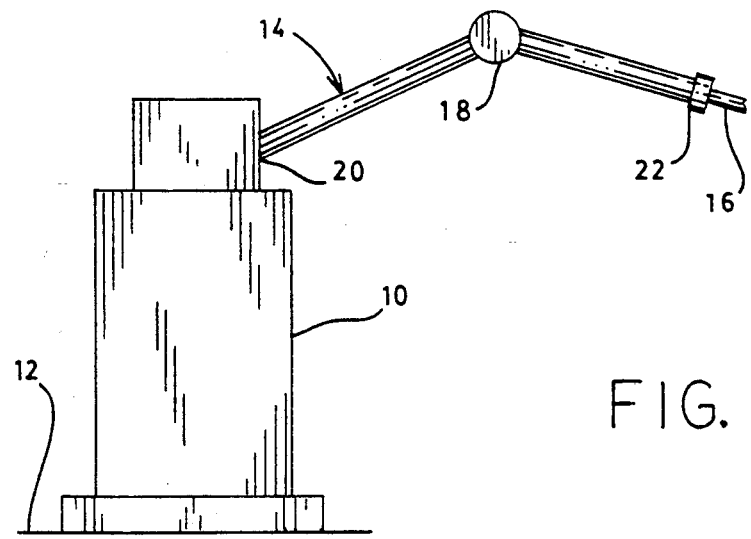
FIG. 1
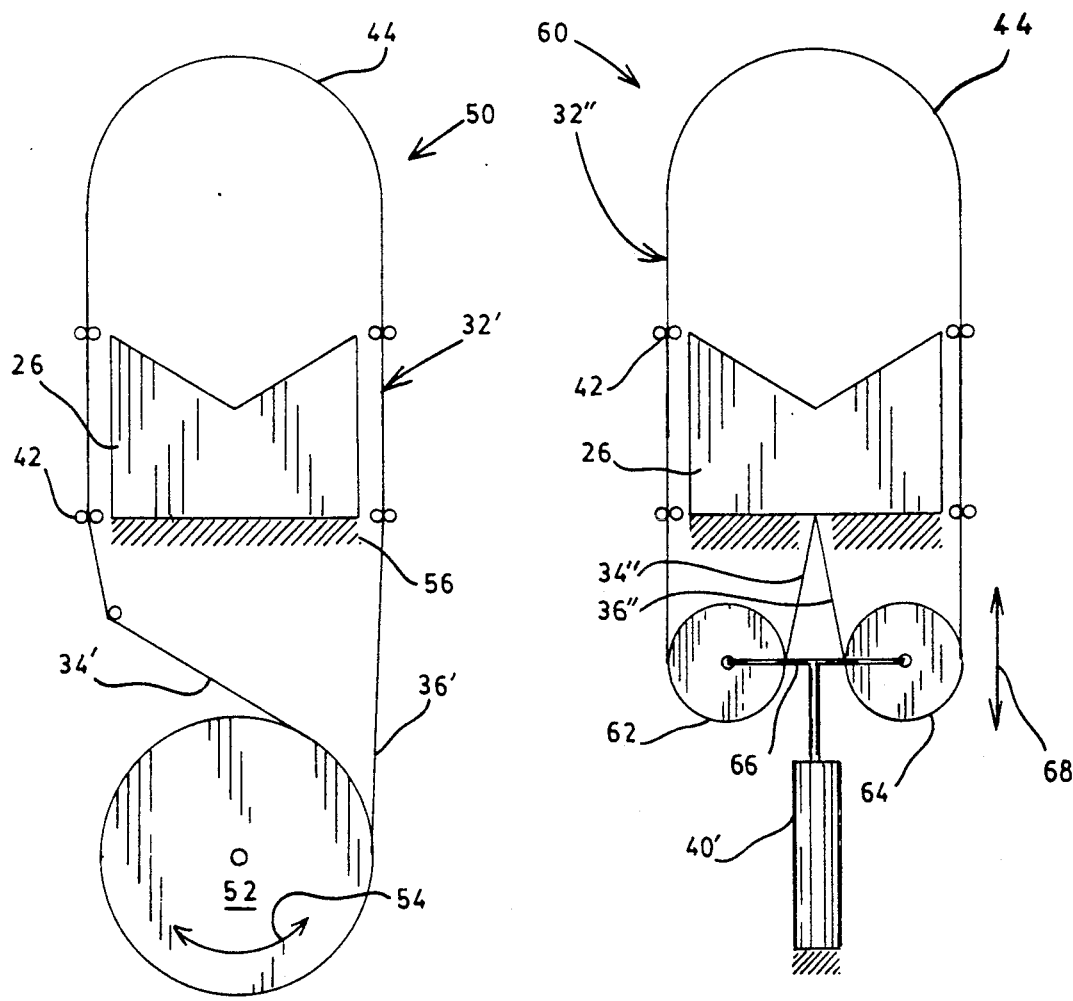
FIG. 3
FIG. 4

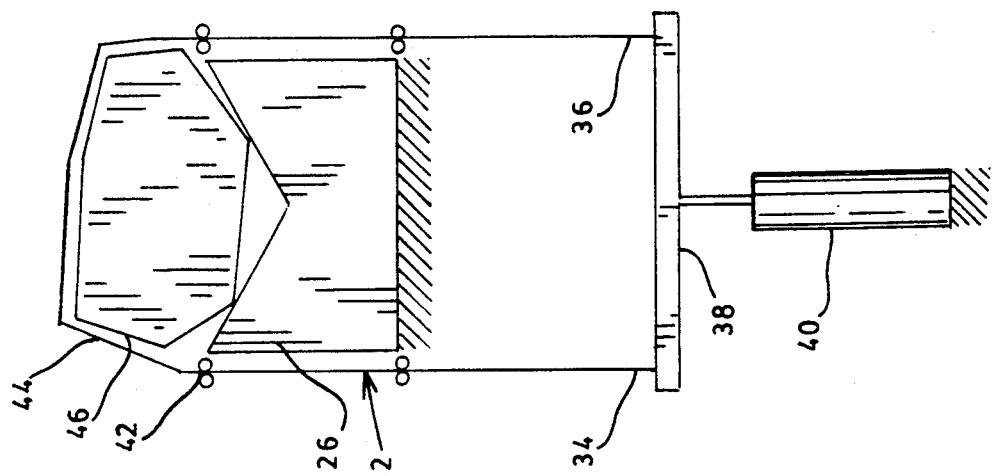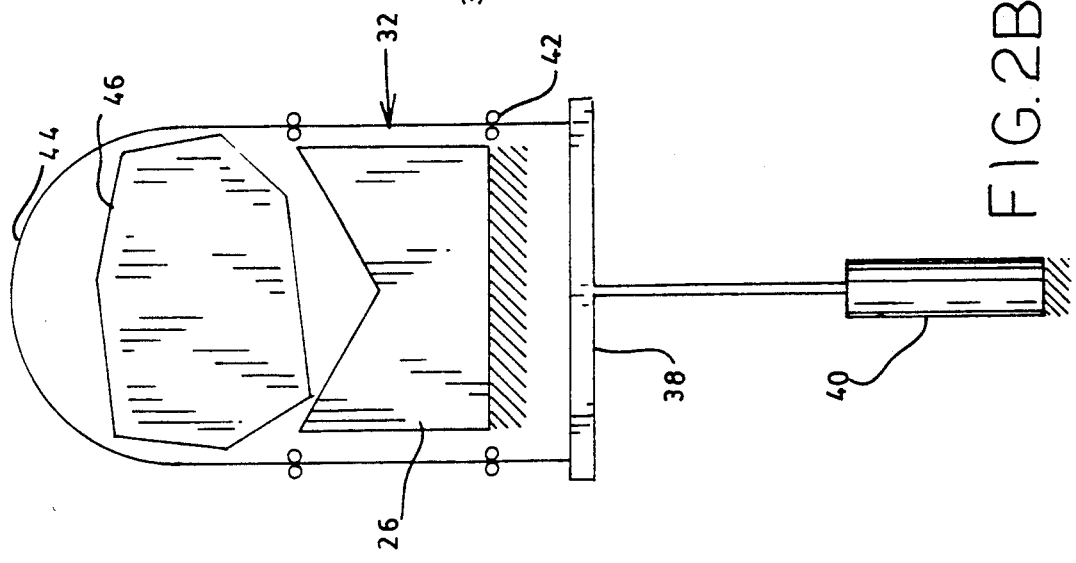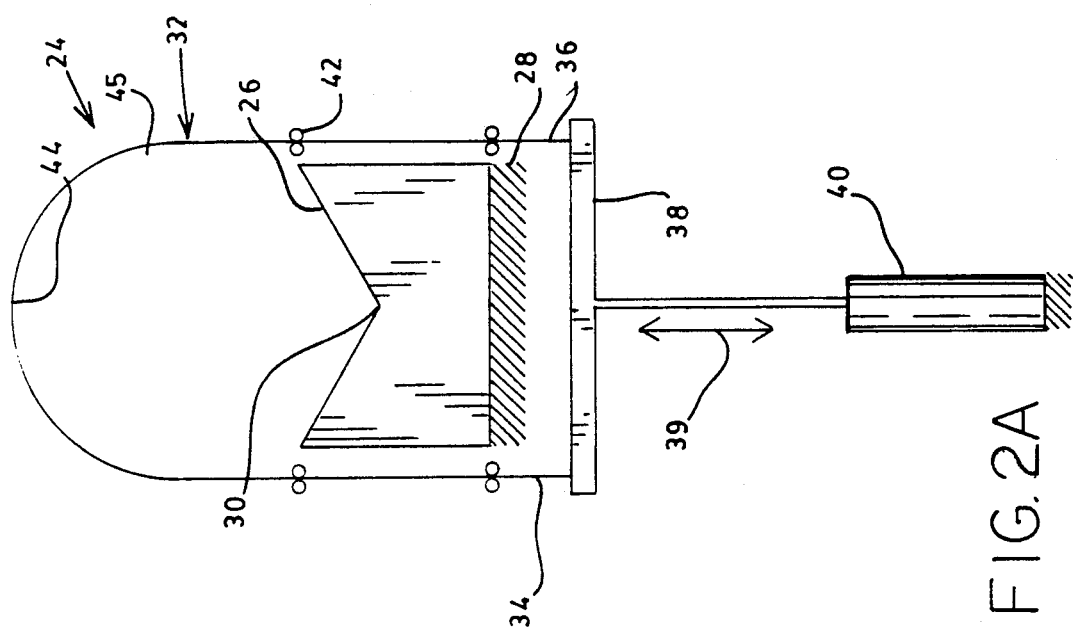

5,310,233

ROBOTIC END GRIPPER WITH A BAND MEMBER TO ENGAGE OBJECT

DESCRIPTION

The U. S. Government has rights in this invention pursuant to Contract No. DE-AC05-84OR21400 awarded by U. S. Department of Energy Contract with Martin Marietta Energy Systems, Inc.

TECHNICAL FIELD

The present invention relates generally to attachments for robotic devices, and more particularly to a end effector to be attached to an operating arm of a robotic device for grasping and holding articles that can have irregular shapes such that the articles can be moved about remotely.

BACKGROUND ART

The use of remotely-controlled (robotic) devices is widely employed in the art of handling hazardous materials. Such materials include, for example, those that contain radioactive components. In addition, such devices are utilized where repetitive operations are to be carried out as in the production line construction of machinery of various types. Another application of such devices is in hostile environments other than those involving radioactivity as for security operations. The robotic devices can either be stationary or can be mobile. In essentially all applications, the robotic device has a movable arm that terminates in a device referred to as an "end effector" meaning it is at the end of the robotic arm for effecting some action.

One of the most common type of end effector utilized in the robotic art is that which simulates the operation of a human hand, even though in a very simplified manner. Typical of these hand-simulating end effectors are described in numerous patents, for example, U.S. Pat. Nos.: 4,652,204 issued to E. M. Arnett on Mar. 24, 1987; 4,950,015 issued to U. R. Nejib, et al., on Aug. 21, 1990; and 4,896,914 and 5,011,207 issued to S. S. Stevens on Jan. 30, 1990 and Apr. 30, 1991, respectively. Such devices, also, are described in several Russian patents, including: 571,369; 611,775; 689,824; 772,844; 1,191,283; and 1,451,002. Other patents that may be pertinent to an evaluation of the present invention are U.S. Pat. Nos.: 433,356 issued to G. S. Long on Jul. 29, 1890; 1,569,496 issued to E. C. Johnson on Jan. 12, 1926; 1,661,064 issued to H. Blaser on Feb. 28, 1928; and 3,540,769 issued to G. E. Rosser on Nov. 17, 1970.

A large number of the devices described in these patents are not adaptable, without excessive cost, to applications in the robotic art. Others, while providing for grasping and holding of items, are too complex for large scale use on a routine basis for grasping and holding of items. Further, still other devices of the prior art cannot be utilized to grasp and hold items of irregular shape and which may differ substantially in size. Certain of the devices which utilize cables for the grasping and holding of items will, in robotic applications where significant extension is required, droop and thus be ineffective for accurate placement to grasp and hold an item.

Accordingly, it is an object of the present invention to provide an end effector for robotic systems that can be used to grasp and hold objects that vary substantially in size and shape without change of the configuration of the end effector.

Another object of the present invention is to provide an end effector for robotic systems that can extend substantially beyond the robotic arm to which it is attached and be accurately placed on an object to grasp and hold the same.

A further object of the present invention is to provide an end effector for robotic systems that includes a shield or cover to at least semi-encase an object after being grasped by the end effector.

It is also an object of the present invention to provide an end effector for robotic applications that has a band for grasping and holding an object, the band having sufficient width such that a loop formed by the band will not droop such that the band can be accurately placed on the object to be grasped.

Also, another object of the present invention is to provide an end effector for robotic applications that has a band for grasping and holding an object, the band being adjustable in length so as to grasp objects of differing size.

These and other objects of the present invention will become apparent upon a consideration of the drawings that follow together with a complete description thereof.

DISCLOSURE OF THE INVENTION

In accordance with the present invention, there is provided a end effector for attachment to the distal end of a robot arm. The end effector includes an anvil having a concave surface, such as a V-shaped surface, a band to encircle an object, and mechanism to draw the band and the object so as to position the object against the concave surface of the anvil. This motion is accomplished, in one embodiment, by attaching opposite ends of the band to a movable member, with this movable member moving in respect to the anvil. In another embodiment, provision is made to effectively shorten the length of the band to draw the object against the anvil. Either embodiment accommodates objects of different size. A further embodiment provides for placing a cover or enclosure over the object after being grasped by the band. Due to the relative width of the band vs. its thickness, the band does not droop while being extended to grasp an object.

BRIEF DESCRIPTION OF THE DRAWINGS

FIG. 1 is a schematic drawing of a robot system to which the subject end effector is attachable.

FIGS. 2A, 2B and 2C are schematic drawings illustrating use of one embodiment of the present invention for grasping and holding an irregularly-shaped object.

FIG. 3 is a schematic drawing illustrating another embodiment of the present invention.

FIG. 4 is a schematic drawing illustrating still another embodiment of the present invention.

BEST MODE FOR CARRYING OUT THE INVENTION

Figure 5:
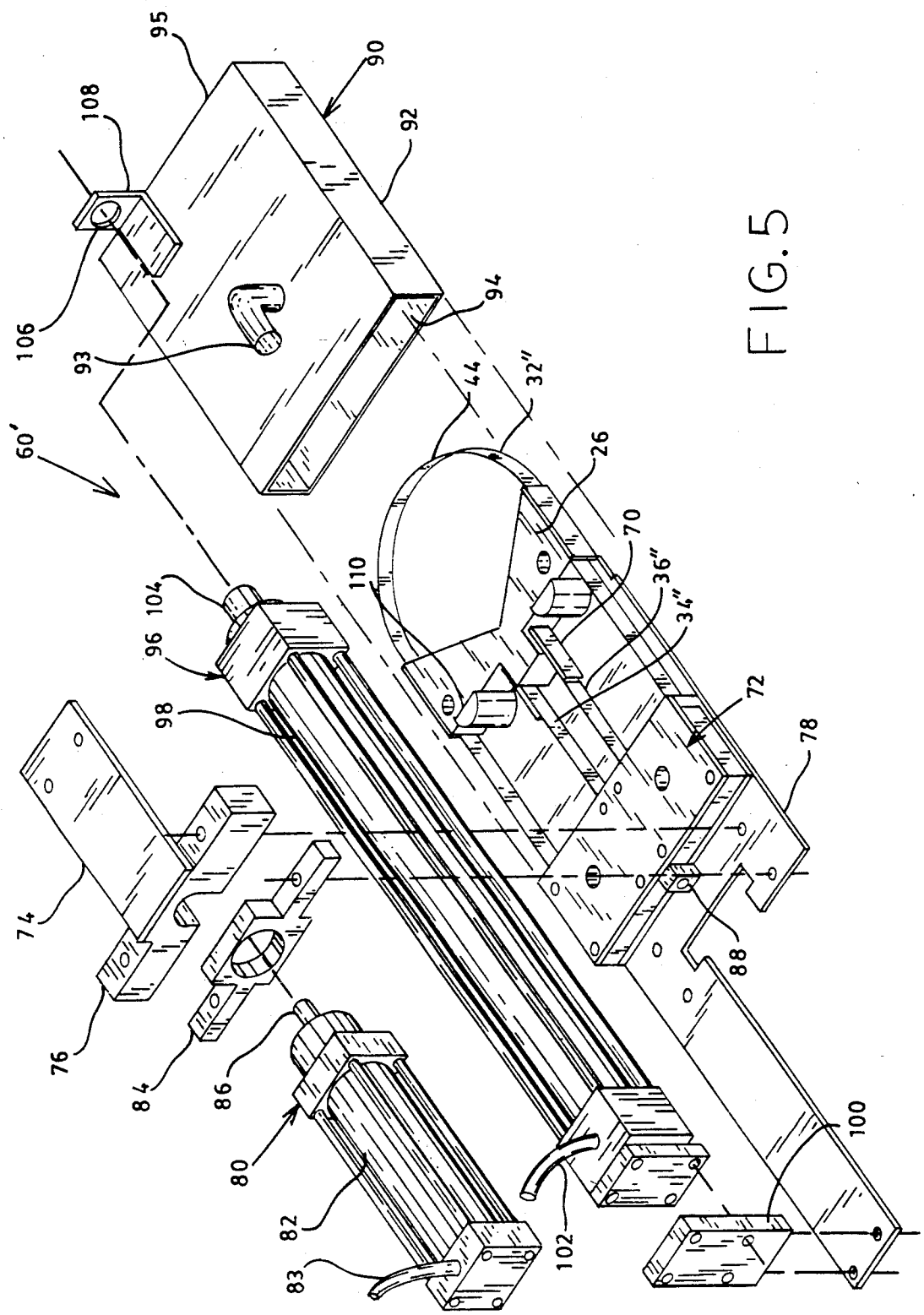
FIG. 5 is an exploded isometric drawing of the detailed construction of the embodiment illustrated in FIG. 4.

The general environment in which the present invention is utilized is illustrated schematically in FIG. 1. Depicted is a robot 10 which may be either stationary or mobile on a support surface 12. This robot 10 is provided with an arm unit 14 of any conventional design, and terminates in an end effector 16 of the type(s) described hereinafter. The robot 10 is given operating signals from a remote location (not shown) such that the arm unit 14 can be moved so as to position the end effector 16 at any given location and produce any desired motion. Further, these signals may be used to cause the robot 10 to move on the surface 12 (if the robot 10 is movable). The arm unit 14 is depicted as having a singular angle-adjusting means 18; however, more or less such angle-adjusting means can be incorporated into the arm unit 14 such as at the "shoulder" 20 and the "wrist" 22.

One embodiment of the end effector of the present invention is depicted schematically at 24 in FIG. 2A. This embodiment has a V-block 26 (as a preferred concave surface because it tends to center an object during grasping) which is illustrated as being fixed at 28 relative to the distal end of a robot arm unit 14 (see FIG. 1). While the V-block 26 is shown as having the apex 30 of the angular surface at the center, other positions are within the scope of the invention. Also, as discussed below, the V-block can be movable. Typically, the concave surface of the V-block 26 defines an included angle of about one-hundred twenty degrees. For applications where the object to be grasped is fragile, the concave surface can be configured to match that of the object to equalize pressure on the surface.

A band 32, which can be metallic (or a material that is substantially non-elastic), is carried by the end effector 24 and has opposite ends 34 and 36 attached to a movable block 38 that can move in directions indicated by the double-ended arrow 39. If desired, at least the bight portion of the band 32 (and/or the V-block 26) can be fabricated of a material having a low thermal conductivity material. Thus, heat transfer is limited between the band 32 and any object held thereby. The term "band" is meant to mean a member that has a width substantially greater than its thickness, the thickness being substantially uniform. Typically, the band has a width of about 0.5 inch, and a thickness of a few thousandths of an inch. However, if desired, the band can have a width of up to several inches. Motion thereof is typically imparted by a linear actuator 40, typically a pneumatic or hydraulic cylinder-piston device. Typically, guide members, as at 42, direct the band 32 as it moves. The actuator 40 causes the ends 34, 36 to move linearly as the bight 44 of the band 32 moves toward or away from the V-block 26 to reduce or enlarge the area 45 encircled by the bight 44.

FIGS. 2B and 2C illustrate the use of the device depicted in FIG. 2A as grasping an object 46. It can be seen in FIG. 2B how the rigidity of the band 32 permits encircling the object 46 with the bight 44. Then, in FIG. 2C the band 32 is tightened around the object 46 as the movable block 38 is moved relative to the V-block 26 by the actuator 40 such that the surface of the object 46 is brought into contact with the concave surface of the V-block 26 such that the object 46 can be moved by the robot arm 14 to any desired location.

Although FIGS. 2A-C, indicate the V-block 26 as being fixed in position (indicated by lines 28) and the block 38 as being movable, their roles can be reversed. If the V-block 26 is movable, the actuator 40 would be attached thereto. Also, if desired, sufficient actuators can be used to make both V-block 26 and block 38 movable.

Another embodiment of the present invention is shown generally at 50 in FIG. 3. All elements that are unchanged from FIG. 2A carry the same identifying numbers, and any that are modified carry primed numbers. In this embodiment the opposite ends 34', 36' of the band 32' engage a pulley 52 that is adapted to rotate in a direction indicated with the double-headed arrow 54. Rotation is accomplished by any conventional mechanism such as a motor and shaft 55. Thus, for example, as the pulley 52 is rotated clockwise, the bight 44 of the band 32' is drawn toward the V-block 26; rotation in the opposite direction extends the bight 44. As with the embodiment of FIG. 2A, the V-block 26 is illustrated as being fixed at 56. However, an appropriate actuator (not shown) can be attached thereto to further assist in the grip of an object.

Still another embodiment of the present invention is illustrated generally at 60 in FIG. 4. In this embodiment the ends 34", 36" of the band 32" each pass over separate pulleys 62, 64 and are attached to the V-block 26. The pulleys 62, 64 are rotatably mounted on an actuator 66. Thus, as the actuator 66 moves the pulleys 62, 64 relative to the V-block 26, in directions indicated by the double-ended arrow 68, the bight 44 of the band 32" is either moved toward or away from the V-block 26 for purposes of grasping or releasing an object (not shown). As in the other embodiments, the V-block 26 can also be moved by appropriate actuators if desired.

An exploded perspective drawing of the embodiment of FIG. 4 is illustrated in FIG. 5 at 60'. In this view it can be understood that the band 32" passes through guides (not shown) in the V-block 26. The extreme ends 34" and 36" of this band 32" are joined to the center of the rear face of the V-block 26 as with clamp members 70 after passing over pulleys within housing 72 (shown in detail in FIG. 6).

This embodiment is adapted to be attached to a conventional robot arm using, for example, the plate 74. Typically, through the use of block 76, this plate 74 supports a base member 78 to which the V-block 26 is also attached and with respect to which the housing 72 moves. Also attached to the base member 78, with any suitable means, is an actuator assembly 80 that includes at least an operator 82, such as a pneumatic or hydraulic cylinder. The operator cylinder 82 is provided with at least one line 83 for the introduction of pressure. Of course, an appropriate outlet port (not shown) would be provided. This actuator assembly 80 is mounted from the base member 78 using a block 84. An actuator rod 86 of the operator 82 is engaged with a receptor 88 in the housing 72 such that movement of the actuator rod 86 causes linear motion of the housing 72. As discussed above, movement of the housing 72 away from the V-block 26 causes the bight 44 of the band 32" to move closer to the V-block 26 so as to grasp an object (not shown). The opposite movement of the actuator rod 86 and housing 72 opens the loop of the band 32".

For some applications of the present invention it is desirable to provide a shield or cover 90 to cover an object when grasped by the band 32". This cover 90 is formed of an enclosure 92 that, when in a retracted (stored) position, generally encloses the housing 72 and can enclose a rear portion of the V-block 26. It can then be extended to enclose the bight 44 of the band 32" and any object held thereby. Thus, the enclosure 92 is open at ends 94, 95. In this particular illustration, the enclosure 92 is sized to accept a flat disk object; however, other configurations can be used for objects of other sizes. Among other advantages of the cover 90 is that of ensuring the positioning of an object relative to the band 32". The enclosure 92 can be a thermally insulating material, for example, if the object being handled has an elevated temperature that is to be preserved. Further, it can be fabricated from a metal, a plastic or other materials for a particular application. It can even provide some radiation shielding if needed or desired. In addition, since the V-Block 26 forms one end closure and the band 32" forms the other end closure (when the cover 90 is extended), a protective gas can be introduced into the enclosure 92 as through port 93.

Movement of the cover 90 is effected by a second actuator assembly 96 having an actuating cylinder 98. This second actuator assembly 96 is fastened to the plate 78 with a mounting plate 100. The cylinder 98 can be either pneumatic or hydraulic, and has at least one line 102 for the application of pressure thereto. Of course, there would be an outlet port (not shown) provided. Further, an actuator rod 104 of the cylinder 98 engages an aperture 106 in a bracket 108 attached to the enclosure 92. In this manner, when the actuator rod 104 is withdrawn into the cylinder 98, the cover 90 is moved away from the bight 44 and any object contained thereby; and extension of the actuator rod 104 causes the cover 90 to be moved over the bight 44 and any object. The cover 90 is typically guided over the band 32" using, for example, low friction guides 110. Of course, other guiding means can be used as will be recognized by persons skilled in the art.

Figure 6:
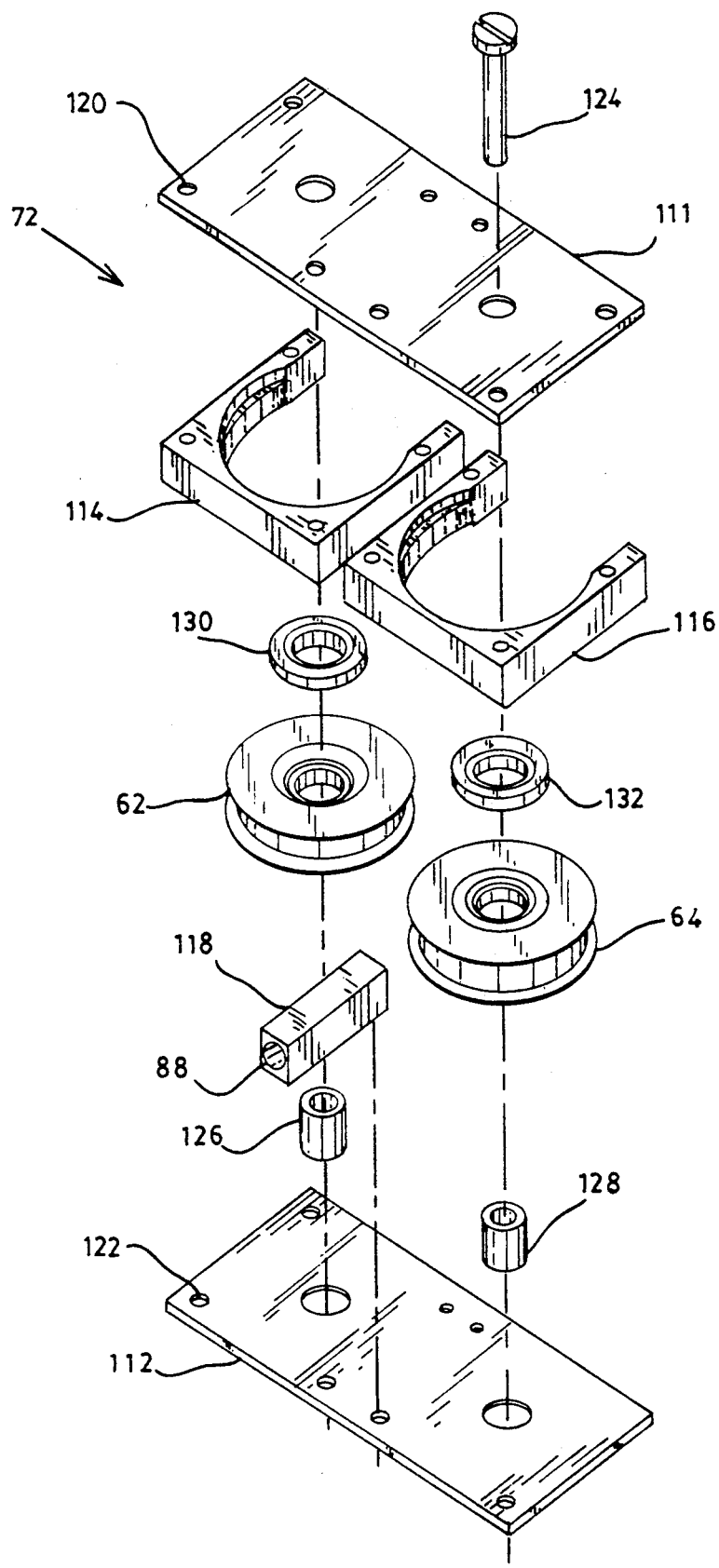
FIG. 6 is an exploded isometric drawing of a portion of the embodiment of FIG. 5.

Details of the housing 72 are shown in the exploded view of FIG. 6. A pair of plates 111 and 112 enclose band guides 114 and 116, together with a member 118 having the afore-mentioned receptor 88 for the actuator rod 86 (see FIG. 5). These components are assembled using any conventional fasteners, such as bolts (not shown) through openings such as indicated at 120, 122, etc. The band guides 114, 116 enclose the afore-mentioned pulleys 62, 64 illustrated in FIG. 4. These pulleys 62, 64 are rotatable on suitable shafts, as indicated at 124, and bearing members depicted at 126, 128, 130 and 132. Thus, as described above, as the housing 72 is moved either forward or in reverse relative to the base member 78, since ends of the band 32" are fixed to the rear of the fixed V-block 26, the band 32" causes rotation of the pulleys 62, 64 within the guides 114, 116 in the manner described with regard to FIG. 4.

It therefore will be understood that any one of the embodiments of the present end effector can be attached to a robotic arm 14 as illustrated in FIG. 1 using, for example, plate 74. In particular, the embodiment of FIGS. 5 and 6 is adapted to grasp an object 46 (FIG. 2C) by encircling the object with the band 32" and drawing the object against the concave surface of the V-block 26 to grasp the object. If desired, the cover 90 is then extended to enclose the band 32" and the object. When held in this manner, the object can be moved to any desired location within the reach of the robotic arm 14. Opposite motion of the cover 90 (if used) and the band 32" then releases the object at the new location.

From the foregoing it will be recognized by persons skilled in the art that a relatively inexpensive but serviceable end effector has been provided. Due to the configuration of the convex surface of the anvil and the flexibility of the band, objects of essentially any surface configuration can be grasped. Where the objects tend to be fragile, the anvil is configured to fully conform to at least a portion of the surface of the object to distribute pressure on that surface. The band has sufficient rigidity, due to its transverse width, such that it can be extended a substantial distance from the anvil without any appreciable droop. This is in contrast to the cable loops utilized in the prior art. When used to handle large and/or heavy loads, the band can be backed by a sprocketed chain or belt. The embodiment including a cover member adds additional security in maintaining the grasp of objects during movement and, if desired, provides any desired protection to the object or to the environment of the object. If desired, the perimeter of a grasped object can be determined by the position of the band actuator.

Although certain sizes and materials are cited for describing the present invention, these are given only for the purpose of illustration and not for limiting the invention. Rather, the invention is only to be limited by the appended claims, or their equivalents, when read together with the complete disclosure herein.

We claim:

1. A gripper for use in grasping an object, said gripper comprising:
    an anvil member, said anvil member being provided with a concave surface to contact a surface of said object;
    a band member for movement relative to said anvil member, said band member having opposite end portions and a bight portion for encircling and engaging said object, said band member further having a thickness sufficiently thin so as to be substantially flexible and a sufficient width transverse to said thickness to substantially prevent droop of said bight portion when extended from said anvil member, said opposite end portions of said band member passing over at least one pulley member; and
    actuator means engaged with said pulley member for moving said opposite end portions of said band member relative to said anvil member and therefore moving said bight portion of said band member relative to said concave surface to selectively engage and disengage said object between said bight portion of said band member and said concave surface of said anvil member.

2. The gripper of claim 1 wherein said concave surface has a surface contour substantially matching a surface contour of at least a portion of said object.

3. The gripper of claim 1 wherein said concave surface has a V-shaped contour.

4. The gripper of claim 3 wherein said V-shaped contour has an apex equidistanced from opposite edges of said anvil member.

5. The gripper of claim 1 wherein both of said opposite end portions of said band member pass over a single pulley member, and said actuator means rotates said pulley member relative to said anvil member to selectively move said bight portion toward and away from said concave surface.

6. The gripper of claim 1 wherein both of said opposite end portions of said band member pass over individual pulley members and attach to said anvil member, and wherein said actuator means moves said pulley members linearly with respect to said anvil member to selectively move said bight portion toward and away from said concave surface.

7. The gripper of claim 1 further comprising:
    a cover member to enclose said bight portion of said band member and said anvil member; and actuator means connected to said cover member for selectively moving said cover member over said bight portion and said anvil member, and for selectively retracting said cover member from said bight portion.

8. A gripper for attachment to a robotic arm to selectively grasp an object, said gripper comprising:

a base member;

an anvil member attached to said base member, said anvil member being provided with a concave surface configured to effectively contact a surface of said object;

a band member for movement relative to said anvil member, said band member having opposite end portions and a bight portion for encircling said object, said opposite end portions attached to said anvil member, said band member further having a thickness sufficiently thin so as to be substantially flexible and a width transverse to said thickness to substantially prevent droop of said bight portion when extended from said anvil member;

a housing member mounted on said base member, said housing member containing a pair of rotatably mounted pulley members, each of said pulley members receiving said band member proximate one of said opposite end portions of said band member; and linear actuator means engaged with said housing member for moving said housing member relative to said anvil member and thereby moving said bight portion relative to said concave surface to engage and disengage said band member and said concave surface relative to said object.

9. The gripper of claim 8 wherein said concave surface has a surface contour substantially matching a surface contour of at least a portion of said object.

10. The gripper of claim 8 wherein said concave surface has a V-shaped contour having an apex equidistanced from opposite edges of said anvil member.

11. The of claim 8 further comprising:

a cover member to enclose said bight portion of said band member and said anvil member; and actuator means connected to said cover member for selectively moving said cover member over said bight portion and said anvil member, and for selectively retracting said cover member from said bight portion.

12. The gripper of claim 8 further comprising attachment means for attachment to said robotic arm.

13. A gripper for attachment to a robotic arm to selectively grasp an object, said gripper comprising:

a base member;

an anvil member attached to said base member, said anvil member being provided with a V-shaped concave surface configured to effectively contact a surface of said object, said V-shaped concave surface having an apex equidistanced from opposite edges of said anvil member;

a band member for movement relative to said anvil member, said band member having opposite end portions and a bight portion for encircling said object, said opposite end portions attached to said anvil member, said band member further having a thickness sufficiently thin so as to be substantially flexible and a sufficient width transverse to said thickness to substantially prevent droop of said bight portion when extended from said anvil member;

a housing member mounted on said base member, said housing member containing a pair of rotatably mounted pulley members, each of said pulley members receiving said band member proximate one of said opposite end portions of said band member;

linear actuator means engaged with said housing member for selectively moving said housing member relative to said anvil member and thereby moving said bight portion relative to said concave surface to engage and disengage said band member and said concave surface relative to said object; and attachment means for attaching to said robotic arm.

14. The gripper of claim 13 further comprising:

a cover member to enclose said bight portion of said band member and said anvil member; and actuator means connected to said cover member for selectively moving said cover member over said bight portion and said anvil member, and for selectively retracting said cover member from said bight portion.

15. The end effector of claim 14 further comprising means for introducing a gas into said cover member.

16. The gripper of claim 13 wherein said band member is fabricated from a low thermal conductivity material and thereby minimizes heat transfer with respect to said object.

17. The gripper of claim 13 wherein said band member and said anvil member are fabricated from a low thermal conductivity material and thereby minimize heat transfer with respect to said object.

18. A gripper for use in grasping an object, said gripper comprising:

an anvil member, said anvil member being provided with a concave surface to contact a surface of said object;

a band member for movement relative to said anvil member, said band member having opposite end portions and a bight portion for encircling said object, said band member further having a thickness sufficiently thin so as to be substantially flexible and a sufficient width transverse to said thickness to substantially prevent droop of said bight portion when extended from said anvil member;

actuator means engaged with said band member for moving said bight portion relative to said concave surface to selectively engage and disengage said band member and said concave surface relative to said object;

a cover member to enclose said bight portion of said band member and said anvil member; and a further actuator means connected to said cover member for selectively moving said cover member over said bight portion and said anvil member, and for selectively retracting said cover member from said bight portion and said anvil member.

19. The gripper of claim 18 wherein said anvil member is attached to a base member, and further comprises a housing member mounted on said base member, said housing member containing a pair of rotatably mounted pulley members, each of said pulley members receiving said band member proximate one of said opposite end portions of said band member; and wherein said actuator means is a linear actuator engaged with said housing member for moving said housing member relative to said anvil member and thereby moving said bight portion of said band member relative to said concave surface to engage and disengage said band member and said concave surface relative to said object.

* * * * *